(12) United States Patent
Ochi

(10) Patent No.: US 8,548,617 B2
(45) Date of Patent: Oct. 1, 2013

(54) SOUND OUTPUT CONTROL DEVICE

(75) Inventor: Hikaru Ochi, Kariya (JP)

(73) Assignee: Denso Corporation, Kariya (JP)

( * ) Notice: Subject to any disclaimer, the term of this patent is extended or adjusted under 35 U.S.C. 154(b) by 430 days.

(21) Appl. No.: 12/799,581

(22) Filed: Apr. 27, 2010

(65) Prior Publication Data

US 2010/0274370 A1 Oct. 28, 2010

(30) Foreign Application Priority Data

Apr. 28, 2009 (JP) ................................. 2009-109151

(51) Int. Cl.
*G06F 17/00* (2006.01)
(52) U.S. Cl.
USPC .......................................................... 700/94
(58) Field of Classification Search
USPC ............................................... 713/1; 700/94
See application file for complete search history.

(56) References Cited

U.S. PATENT DOCUMENTS

| 6,898,653 | B2* | 5/2005 | Su et al. ......................... 710/302 |
| 2007/0140187 | A1* | 6/2007 | Rokusek et al. .............. 370/338 |
| 2008/0126929 | A1* | 5/2008 | Bykov .......................... 715/700 |
| 2008/0168188 | A1* | 7/2008 | Yue et al. ........................ 710/15 |
| 2009/0015433 | A1 | 1/2009 | James et al. |
| 2009/0017813 | A1* | 1/2009 | Yuki ............................. 455/419 |

FOREIGN PATENT DOCUMENTS

| JP | 2004-118437 | 4/2004 |
| JP | 2008-283569 | 11/2008 |
| JP | 2009-021670 | 1/2009 |

OTHER PUBLICATIONS

Office action dated Apr. 26, 2011 in corresponding Japanese Application No. 2009-109151.

* cited by examiner

*Primary Examiner* — Andrew C Flanders
*Assistant Examiner* — Alexander Eljaiek
(74) *Attorney, Agent, or Firm* — Harness, Dickey & Pierce, PLC

(57) ABSTRACT

A sound output control device is disclosed. The sound output control device includes an application information acquisition section and a control section. The application information acquisition section is configured to acquire application information from an external device having multiple applications for sound output. The control section is configured to process audio data streamed from the external device through causing the external device to start one of the multiple applications. The control section has a predetermined selection criterion to select a start-candidate application from the plurality of applications. The control section is further configured to select the start-candidate application according to the application information acquired from the external device and the predetermined selection criterion, and cause the external device to start the selected start-candidate application.

12 Claims, 7 Drawing Sheets

SOUND OUTPUT CONTROL DEVICE

CROSS REFERENCE TO RELATED APPLICATION

The present application is based on Japanese Patent Application No. 2009-109151 filed on Apr. 28, 2009, disclosure of which is incorporated herein by reference.

BACKGROUND OF THE INVENTION

1. Field of the Invention

The present invention relates to a sound output control device, which is configured to cause an external device to start one of applications for sound output, and which is further configured to process audio data streamed from the external device.

2. Description of Related Art

In recent years, there has been provided a technique for streaming audio data (e.g., music data) to an in-vehicle apparatus from a modern cellular phone, which typically has multiple applications such as a media player, a terrestrial digital TV application, a radio application, a game application and the like.

JP-2008-283569A discloses a configuration for connecting devices to each other by using Audio/Video Remote Control Profile (AVRCP), which is one of profiles defined in the Bluetooth (registered trademark, also referred to hereinafter as BT) communications standards.

The inventor of the present application has studied a configuration for connecting devices to each other by using the AVRCP. Discussion is given below on such configuration as a related art. It is assumed that an in-vehicle apparatus receives audio data transferred from a cellular phone. By using the AVRCP ver. 1.4 (referred to hereinafter as AVRCP 1.4), the in-vehicle apparatus can acquire application information on multiple applications installed in the cellular phone. However, a technique for the in-vehicle apparatus, after acquiring the application information, to automatically select a most suitable application to be started in the cellular phone has not been established. It is thus difficult for in-vehicle apparatus to optimally process the audio data streamed from the cellular phone. Moreover, unless the technique for automatically selecting a most suitable application to be started in the cellular phone is not established, a user is required to manually select the most suitable application. In such cases, operability is disadvantageously low.

SUMMARY OF THE INVENTION

In view of the above and other difficulties, it is an objective of the present invention to provide a sound output control device that can automatically select a most suitable application to be started in an external device, can make user selection of the most suitable application unnecessary, and can optimally process audio data streamed from the external device.

According to a first aspect of the present invention, a sound output control device includes an application information acquisition section and a control section. The application information acquisition section is configured to acquire application information from an external device having multiple applications for sound output, the application information being information on the multiple applications of the external device. The control section is configured to process audio data streamed from the external device through causing the external device to start one of the multiple applications. The control section has a predetermined selection criterion to select a start-candidate application from the plurality of applications, the start-candidate application being the one of the multiple applications to be started in the external device. The control section is further configured to select the start-candidate application according to the application information acquired from the external device and the predetermined selection criterion, and cause the external device to start the selected start-candidate application.

According to the above sound output control device, it is possible to automatically select a most suitable application to be started in the external device, it is possible to make user selection of the most suitable application unnecessary, and it is possible to optimally process audio data streamed from the external device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

In one embodiment, a sound output control device is applied to an in-vehicle apparatus that is mounted to a vehicle and has a BT communication function.

In the followings, it is assumed that a BT-supporting cellular phone having a BT communication function is carried into a compartment of the vehicle equipped with the in-vehicle apparatus, and the in-vehicle apparatus and the cellular phone are communicable with each other via a BT communication link.

Figure 1:
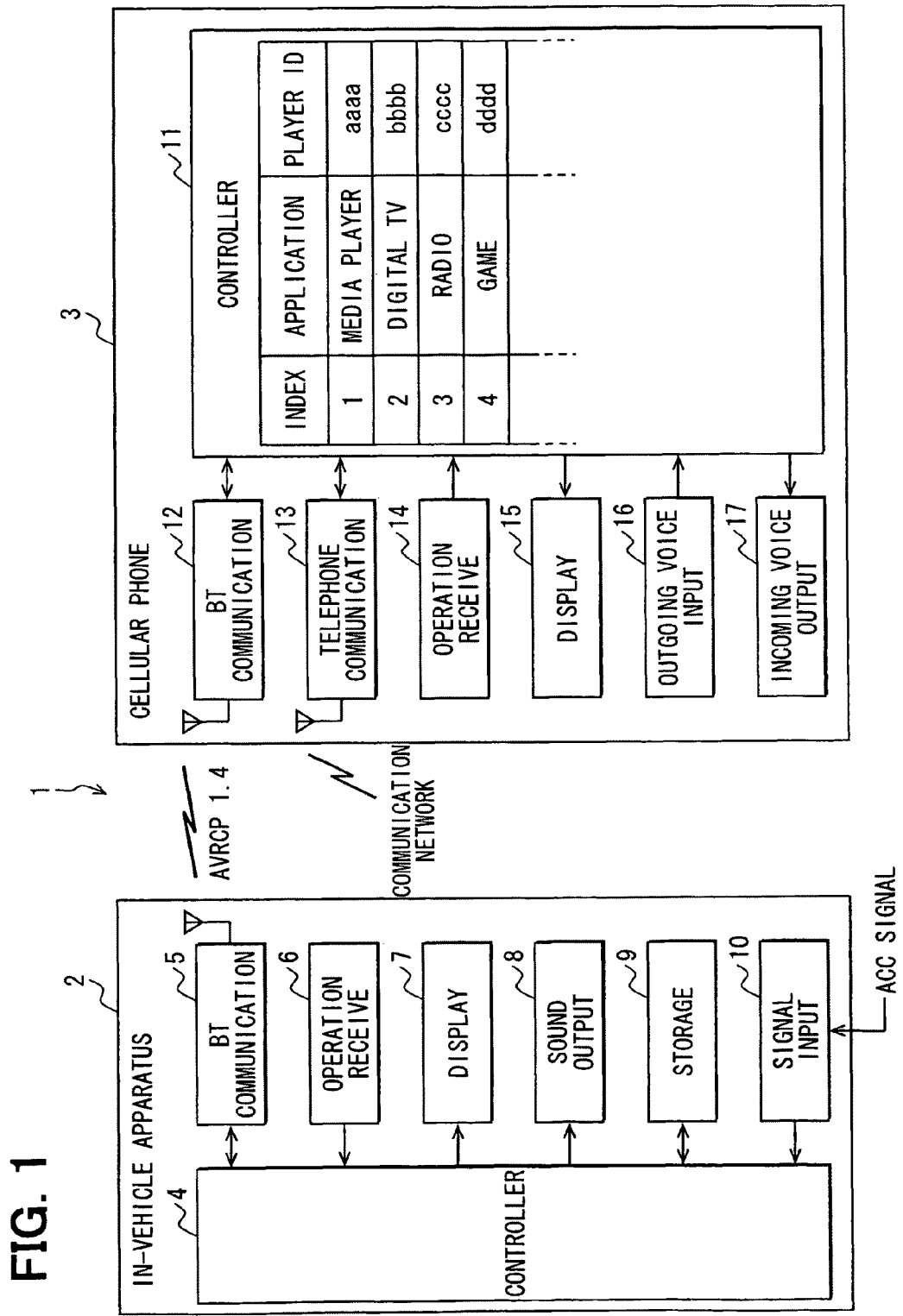
FIG. 1 is a functional block diagram illustrating an in-vehicle apparatus and a cellular phone according to one embodiment.

As shown in FIG. 1, an in-vehicle system 1 includes an in-vehicle apparatus 2 and a cellular phone 3. The in-vehicle apparatus 2 includes a controller 4, a BT communication device 5, and an operation reception device 6, a display device 7, a sound output device 8, a storage medium 9 and a signal input device 10. In the above, the in-vehicle apparatus 2 is an example of a sound output control device, the cellular phone is an example of an external device, the controller is an example of a control section or means. The BT communication device 5 is an example of an application information acquisition section or means, and an example of a communication link connection section or means.

The controller 4 includes a microcomputer, which has a CPU, a RAM, a ROM, an I/O bus and the like. The controller 4 may control generally all of operations of the in-vehicle apparatus 2, including a communications operation, a data management operation and the like. The BT communication device 5 has a function to perform BT communications with the cellular phone 3. When communicating with the cellular phone 3 via a BT communication link, the BT communication device 5 can have connection with the cellular phone 3 by using Audio/Video Remote Control Profile ver. 1.4 (AVRCP 1.4) for remote control of audio and/or video. In addition to the AVRCP 1.4, the BT communication device 5 may have connection using Handsfree Profile (HFP) for handsfree communication, Phone Book Access Profile (PBAP) for phonebook data transfer and the like. The BT communication device 5 may or may not be capable of simultaneously using these profiles to have connection (i.e., multi-connection) with the cellular phone 3. The above profiles means communication protocols defined based on respective functions. In the above, the BT communication link is an example of a local wireless communication link.

The operation reception device 6 includes, for example, a mechanical switch, a touch sensitive button provided on a screen of the display device 7, and the like. When detecting a user operation of the mechanical switch, the touch sensitive button or the like, the operation reception device 6 outputs an operation detection signal indicative of content of the user operation to the controller 4, and the controller 4 analyzes the inputted operation detection signal. The display device 7 includes, for example, liquid crystal display panel. When receiving a display control signal from the controller 4, the display device 7 displays an image on a screen or provides a touch sensitive button on the screen based on the display control signal. The sound output device 8 receives a sound output control signal from the controller 4 and outputs a sound based on the sound output control signal. In the present embodiment, the display device 7 and the sound output device 8 are illustrated as being built in the in-vehicle apparatus 2. Alternatively, the display device 7 and the sound output device 8 may be external with respect to the in-vehicle apparatus 2. For example, when a display device corresponding to the display device 7 and a sound output device corresponding to the sound output device 8 are equipped in the vehicle, the in-vehicle apparatus 2 may be configured to use such display device and sound output device in order to provide the image and the touch sensitive button and in order to output the sound.

The storage medium 9 has storage areas for storing various data. For example, the storage medium 9 has a storage area for storing therein a telephone number and a BT device address of the cellular phone 3, with which the in-vehicle apparatus 2 is communicable via the BT communication link. The signal input device 10 inputs an accessory signal (ACC signal) from a key switch to the controller 4. While the ACC signal from the key switch is in ON (i.e., high level), the controller 4 cause the in-vehicle apparatus 2 to be in a power-on state so that an operation power is supplied from an in-vehicle battery to generally all of functional blocks of the in-vehicle apparatus 2 and the in-vehicle apparatus performs normal operation in a waking up mode. While the ACC signal from the key switch is in OFF (i.e., low level), the controller 4 causes the in-vehicle apparatus 2 to be in a power-off state so that an operation power is supplied from the in-vehicle battery to limited one or ones of the functional blocks of the in-vehicle apparatus 2 and the in-vehicle apparatus 2 performs a low power consumption operation in a sleep mode.

The cellular phone 3 includes a control part 11, a BT communication part 12, a telephone communication part 13, an operation reception part 14, a display part 15, an outgoing voice input part 16 and an incoming voice output part 17. The control part 11 includes a microcomputer, which has a CPU, a RAM, a ROM, an I/O bus and the like. The control part 11 controls generally all of operation of the cellular phone 3, including a communications operation, a data management operation and the like. The control part 11 has multiple applications for sound output, including a media player, a TV application for mobile terrestrial digital audio/video and data broadcasting service, a radio application, and a game application or the like for example. In the above, the TV application is used for broadcasting directed to a movable or mobile object such as a cellular phone and the like. The broadcasting may be terrestrial digital media broadcasting. The multiple applications are registered while indexes and player IDs (application IDs) are being assigned thereto. The player IDs are unique on an application-by-application basis. As shown in FIG. 1, the player ID may be "aaaa" where each "a" is an arbitrary number.

The BT communication part 12 has a function to perform BT communications with the in-vehicle apparatus 2. When communicating with the in-vehicle apparatus 2 via the BT communication link, the BT communication part 12 can have connection with the in-vehicle apparatus 2 by using AVRCP 1.4 defined in BT communications standards. Like the BT communication device 5 of the in-vehicle apparatus 2, the BT communication part 12 of the cellular phone 3 may have connection using the HFP, the PBAP and the like in addition to the AVRCP 1.4, and the to have the connection, and the BT communication part 12 of the cellular phone 3 may be or may not be capable of simultaneously using these profiles.

The telephone communication part 13 has a function to perform wide area wireless communications via a communication network. The operation reception part 14 includes a keyboard, in which multiple keys such as a call key, an answer key, a numeric key, a multi-key and the like are arranged. When detecting a user operation on one of keys, the operation reception part 14 outputs an operation detection signal indicative of content of the user operation to the control part 11, and the control part 11 analyzes the operation detection signal. The display part 15 includes, for example, a liquid crystal display panel. When receiving a display control signal from the control part 11, the display part 15 displays variety of images and windows such as a standby window, an incoming mail notification window and the like based on the display control signal. When the cellular phone 3 is in a telephone communication state, the outgoing voice inputted via the outgoing voice input part 16 is processed in a voice processing module of the control part 11 to create an outgoing voice, and the outgoing voice is transmitted via the communication network. The incoming voice received with the telephone communication part 13 is processed in the voice processing module of the control part 11 and is outputted from the incoming voice output part 17.

Figure 2:
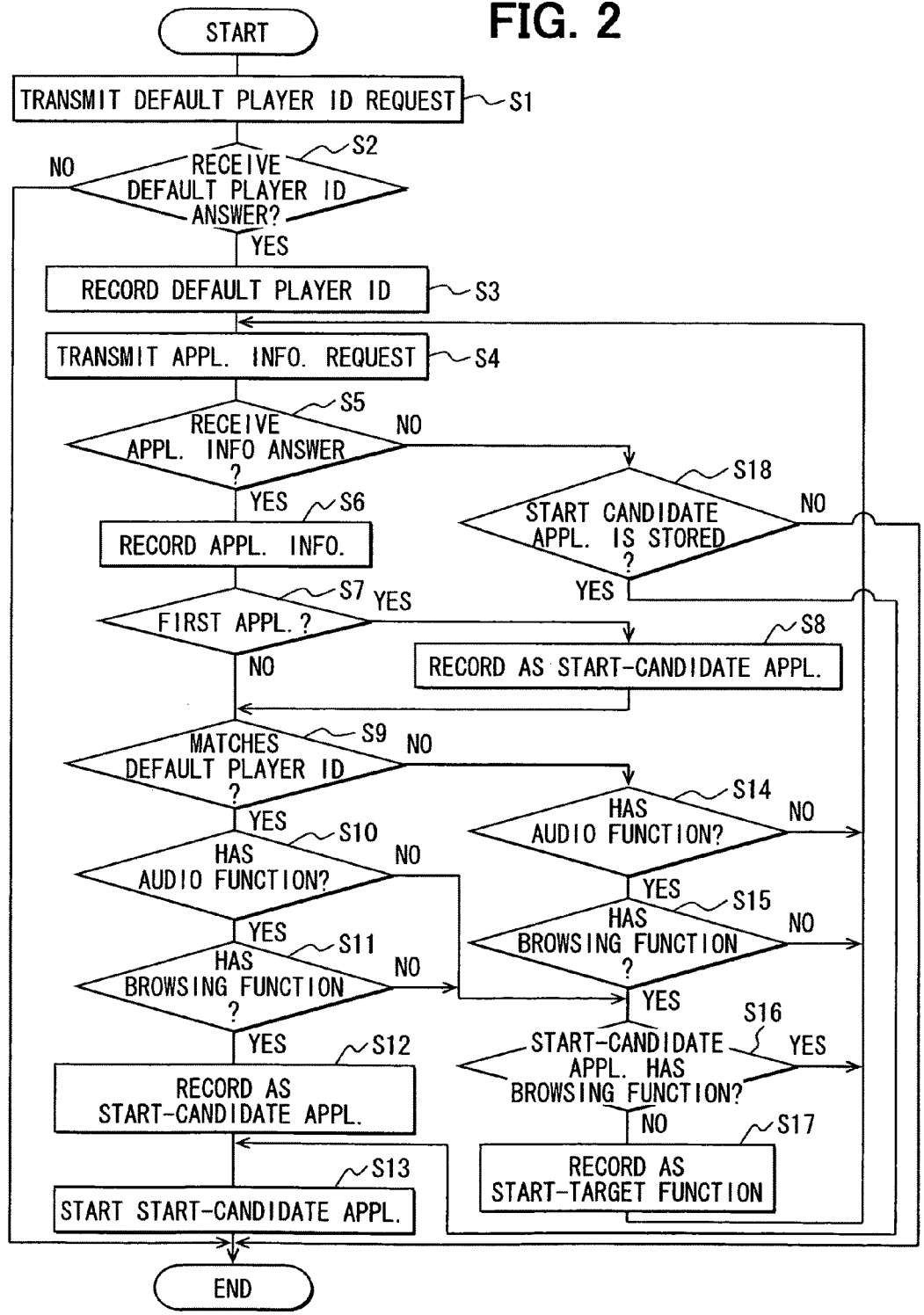
FIG. 2 is a flowchart illustrating processes performed by the in-vehicle apparatus.

Operation of the in-vehicle system 1 is illustrated below with reference to FIG. 2 to FIG. 7. FIG. 2 a flowchart illustrating processes to be performed by the in-vehicle apparatus 2. When the controller 4 of the in-vehicle apparatus 2 determines that, for example, the ACC signal inputted from the key switch to the signal input device 10 is switched from OFF to ON state, the controller 4 switches the in-vehicle apparatus 2 from the sleep mode to the wake up mode, establishes the BT communication link between the BT communication device 5 and the cellular phone 3, and starts performing a connection procedure of the AVRCP 1.4. Although the switching of the ACC signal from OFF to On triggers the start of the connection procedure of the AVRCP 1.4 in the above example, the start of the connection procedure of the AVRCP 1.4 may be triggered by another event. For example, the start of the connection procedure of the AVRCP 1.4 may be triggered by a user manual operation. When finishing the connection procedure of the AVRCP 1.4, the controller 4 performs the process illustrated in FIG. 4 while the connection is made using the AVRCP 1.4.

At S1, the controller 4 transmits a default player ID acquisition request from the BT communication device 5 to the cellular phone 3. At S2, the controller 4 waits for the BT communication device 5 to receive a default player ID acquisition answer from the cellular phone 3 and determines whether the BT communication device 5 receives the default player ID acquisition answer Within a predetermined period after the transmission of the default player ID acquisition request. When the cellular phone 3 receives the default player ID acquisition request from the in-vehicle apparatus 2, the cellular phone 3 retrieves a player ID of a default application, which is an application registered as a default at the present time. Further, the cellular phone 3 transmits to the in-vehicle apparatus 2 the default player ID acquisition answer containing the retrieved player ID as a default player ID.

When the controller 4 determines that the BT communication device 5 receives the default player ID acquisition answer from the cellular phone within the predetermined period after the transmission of the default player ID acquisition request, the determination "YES" is made at S2 and the process proceeds to S3. At S3, the controller 4 extracts the default player ID from the default player ID acquisition answer received from the cellular phone 3, and records the extracted player ID in the storage area of the storage medium 9.

Figure 3:
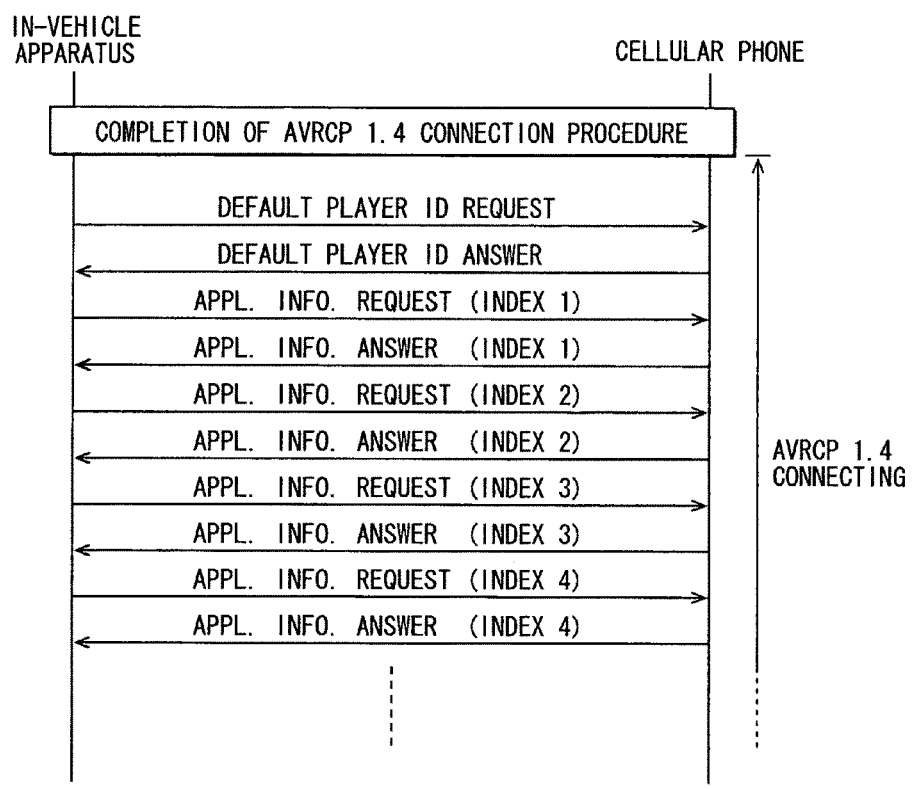
FIG. 3 is a sequence diagram illustrating application acquisition requests and application acquisition answers.

At S4, the controller 4 causes the BT communication device 5 to transmit an application acquisition request to the cellular phone 3. At S5, the controller 4 waits for the BT communication device 5 to receive an application acquisition answer and determines whether the BT communication device 5 receives the application acquisition answer from the cellular phone within a predetermined period after the transmission of the application acquisition request. When the cellular phone 3 receives the application acquisition request from the in-vehicle apparatus 2, the cellular phone 3 determines how many times the cellular phone 3 has received the application acquisition request from the in-vehicle apparatus 2. Further, the cellular phone 3 retrieves information on an application (also called application information) that has the registered index corresponding to the number of times the cellular phone 3 has received the application acquisition request from the in-vehicle apparatus 2, as shown in FIG. 3. The retrieved application information includes information on the player ID of the application, whether the application has an audio function, whether the application has a browsing function, or the like. The cellular phone 3 transmits the application acquisition answer containing the retrieved application information to the in-vehicle apparatus 2.

The audio function herein a function of playback of music data, which represents music. In the present embodiment, it is assumed the media player has the audio function but the multiple applications except the media player (the TV application, the radio application and the game application) do not have the audio function. In this relation, the browsing function herein is a function of transferring information on all music, artist, album, play list and the like to the in-vehicle apparatus 2, as shown in FIGS. 6 and 7. In the present embodiment, it is assumed that the media player has the browsing function but the multiple applications except the media player (the TV application, the radio application and the game application) do not have the browsing function.

As shown in FIG. 3, when the number of times the cellular phone 3 has received the application acquisition request from the in-vehicle apparatus 2 after the finish of the connection procedure of the AVRCP 1.4 is one time, the cellular phone 3 transmits, to the in-vehicle apparatus 2, the application acquisition answer containing the application information on the application whose registered index is "1". When the number of times the cellular phone 3 has received the application acquisition request from the in-vehicle apparatus 2 after the finish of the connection procedure of the AVRCP 1.4 is two times, the cellular phone 3 transmits, to the in-vehicle apparatus 2, the application acquisition answer containing the application information on the application whose registered index is "2".

When the controller 4 determines that the BT communication device 5 receives the application acquisition answer from the cellular phone 3 within the predetermined period after the transmission of the application acquisition request, the determination "YES" is made at S5, and the process proceeds to S6. At S6, the controller 4 extracts the application information from the application acquisition answer and records the extracted application information in the storage are of the storage medium 9. At S7, the controller 4 determines whether the application information received from the cellular phone 3 is the information on the application whose registered index is "1". In other words, the controller 4 may determine whether the number of times the in-vehicle apparatus 2 has received the application acquisition answer after the finish of the connection procedure of the AVRCP 1.4 is one time.

When the controller 4 determines that the application information received from the cellular phone 3 is the information on the application whose registered index is "1", the determination "YES" is made at S7, and the process proceeds to S8. At S8, the controller 4 records the application having the index "1" as a start-candidate application in the storage area of the storage medium 9. In the above, the start-candidate application is a candidate of an application to be started. At S9, the controller 4 determines whether the default player ID recorded at S3 matches the player ID contained in the application information recorded at S6, by comparing the default player ID to the player ID. In the above, the application information recorded at S6 is the latest one when the in-vehicle apparatus 2 has receives the application information multiple times as shown in FIG. 3.I. This is also the case in the below-described processes.

When the controller 4 determines at S7 that the application information received from the cellular phone 3 is not the information on the application having the index "1" but the information on the application having the index equal to or larger than "2", the determination "NO" is made at S7, and the process proceeds to S9. In this case, the controller 4 does not record the application as the start-candidate application. At S9, the controller 4 determines whether the default player ID recorded at S3 matches the player ID contained in the application information recorded at S6, by comparing the default player ID to the player ID.

When the controller 4 determines that the default player ID recorded at S3 s identical to and matches the player ID contained in the application information recorded at S6, the determination "YES" is made at S9 and the process proceeds to S10. At S10, the controller 4 determines whether the application corresponding to the player ID recorded at S6 is an application having the audio function, based on the application information (e.g., the player ID, the existence or nonexistence of the audio function) recorded at S6.

When the controller 4 determines that the application corresponding to the player ID recorded at S6 is an application having the audio function, corresponding to "YES" at S10, the process proceeds to S11. At S11, the controller 4 determines whether the application corresponding to the player ID recorded at S6 has the browsing function, based on the application information recorded at S6, the application information including the player ID, the existence or nonexistence of the browsing function.

When the controller 4 determines that the application corresponding to the player ID recorded at S6 has the browsing function, corresponding to "YES" at S11, the process proceeds to S12. At S12, the controller 4 records the application corresponding to the player ID recorded at S6 as the start-candidate application. In the above, when one of the applications has been recorded as the start-candidate application at this point, the recorded start-candidate application is overwritten with the application corresponding to the player ID recorded at S6. At S13, the controller 4 causes the cellular phone 3 to start the application corresponding to the start-candidate application, and the processes illustrated in FIG. 2 are ended.

When the controller 4 determines at S9 that the default player ID recorded at S3 is not identical to or does not match the player ID contained in the application information recorded at S6, the determination "NO" is made at S9, and the process proceeds to S14. At S14, the controller 4 determines whether the application corresponding to the player ID recorded at S6 has the audio function, based on a piece of the application information recorded at S6, the piece indicating whether the applications has the audio function.

When the controller 4 determines that the application corresponding to the player ID recorded at S6 has the audio function, corresponding to "YES" at S14, the process proceeds to S15. At S15, the controller 4 determines whether the application corresponding to the player ID recorded at S6 has the browsing function based on a piece of the application information recorded at S6, the piece indicating whether the applications has the browsing function.

When the controller 4 determines that the application corresponding to the player ID recorded at S6 has the browsing function, corresponding to "YES" at S15, the process proceeds to S16. At S16, the controller 4 determines whether the application stored as the start-candidate application at this point has the browsing function. When the controller 4 determines that the application stored as the start-candidate application at this point does not have the browsing function, corresponding to "NO" at S16, the process proceeds to S17. At S17, the application indicated by the application information recorded at S6 is recorded as the start-candidate application. After S17, the process returns to S4 so the processes S4 and later are repeatedly performed. At S17 also, if one of the applications has been already stored as the start-target application at this point, the already stored start-candidate application is overwritten with the application corresponding to the player ID recorded at S6.

When the controller 4 determines at S5 that the BT communication device 5 does not receive the application acquisition answer from the cellular phone 3 within the predetermined period after the transmission of the application acquisition request, the determination "NO" is made at S5, and the process proceeds to S18. At S18, the controller 4 determines whether the start-candidate application is stored at this point. When the controller 4 determines that the start-candidate application is stored at this point, corresponding to "YES" at S18, the process proceeds to S13. At S13, the controller 4 causes the start-candidate application to be started. After S13, the processes illustrated in FIG. 2 are ended.

Through the above processes, the in-vehicle apparatus 2 can operate in the following way. When the application registered in the cellular phone 3 as a default (default application) has the audio function and the browsing function, the in-vehicle apparatus 2 selects the default application and causes the cellular phone 3 to start the default application. When the application registered as the default in the cellular phone 3 is not an application having the audio function and the browsing function, the in-vehicle apparatus 2 selects the application having a small, registered index in the cellular phone 3 (i.e., the application having a high priority in the cellular phone 3) from among the applications having the audio function and the browsing function, and the in-vehicle apparatus 2 causes the cellular phone 3 to start the selected application.

Explanation is given below in more detail by using a specific example. First, it is assumed that the application registered as a default in the cellular phone 3 is the media player, and the applications to which indexes are assigned include the media player. In this case, since the media player has the audio function and the browsing function, the controller 4 records the media player as the start-candidate application in the storage area and causes the cellular phone 3 to start the media player, which is stored at this point as the candidate to be started. Second, it is assumed that the application registered as a default in the cellular phone 3 is other than the media player and is one of the TV application, the radio application and the game application. In this case, when the applications to which the indexes are assigned include the media player, since the media player has the audio function and the browsing function, the controller 4 records the media player as the start-candidata application in the storage area and causes the cellular phone 3 to start the media player, which is stored as the start-candiadata application.

As seen from the above, when the applications to which the indexes are assigned include the media player, the in-vehicle apparatus 2 can cause the cellular phone 3 to start the media player and stream the audio data to the in-vehicle apparatus 2, and the in-vehicle apparatus 2 can process the audio data streamed by the media player of the cellular phone 3, regardless of which indexes are assigned to applications other than the media player.

In the present embodiment, the in-vehicle apparatus 2 performs the followings in starting the media player. In the below-described illustrations, a case of AVRCP-1.3-based connection is compared to a case of AVRCP-1.4-based connection. FIG. 4 illustrates display transition in the case of the AVRCP-1.3-based connection according to a comparison example. FIGS. 5 to 7 illustrate display transition in the case of the AVRCP-1.4-based connection according to the present embodiment.

Figure 4A:
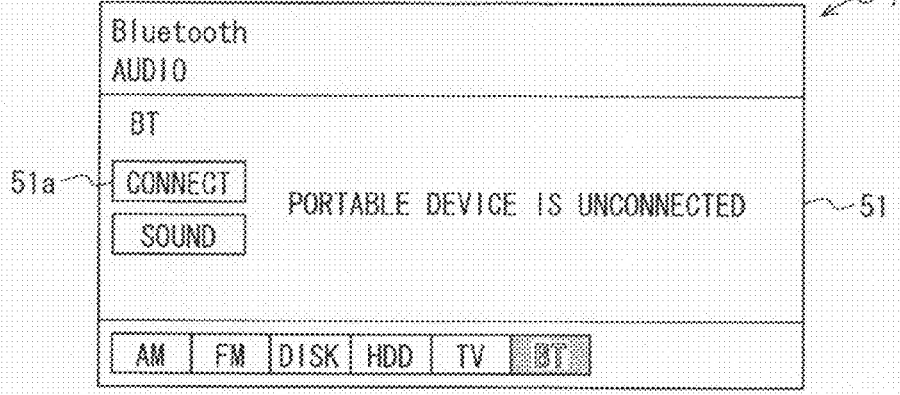
FIGS. 4A to 4C are diagrams each illustrating a window in a case of AVRCP 1.3.
Figure 4B:
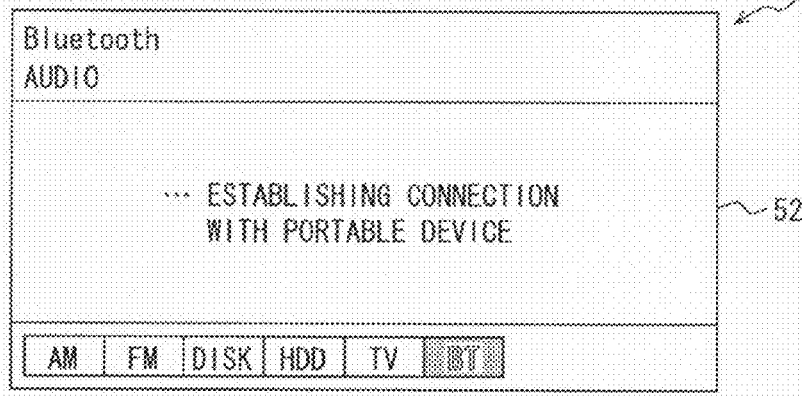
Figure 4C:
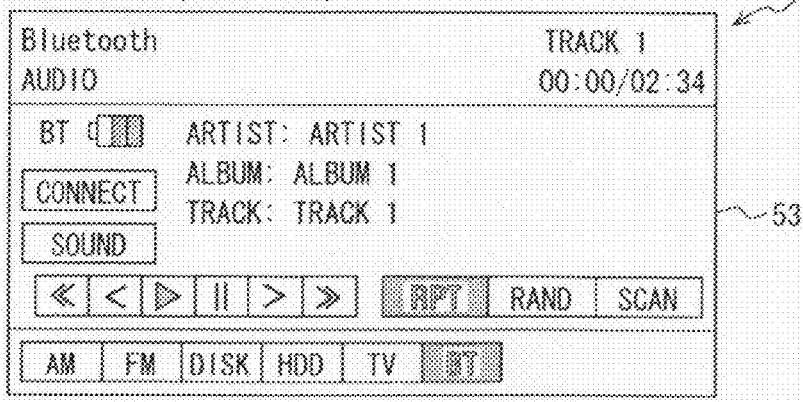

In the case of the AVRCP-1.3-based connection, as shown in FIG. 4A, the controller 4 can display a unconnection window 51 on the display device 7 to indicate that a portable device (e.g., cellular phone) is unconnected with the in-vehicle apparatus 2. The unconnection window 51 has a "connect" button 51a. When the controller 4 determines that the "connect" button 51a of the disconnection window 51 is pressed, the controller 4 displays a connection establishing window 52 on the display device 7 to indicate that the connection with a portable device is being established, as shown in FIG. 4B. In response to completion of AVSLC (audio/video service level connection), the controller 4 displays a main window 53 on the display device 7 at all, as shown in FIG. 4C. Thus, after that, a user is generally impossible to perform a browsing operation.

Figure 5A:
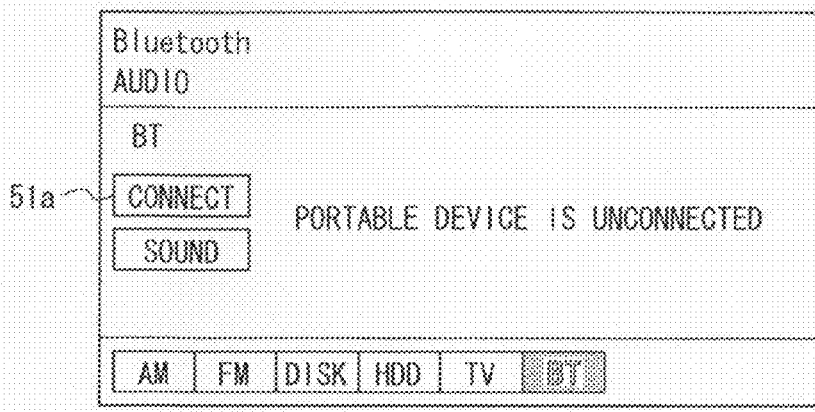
FIG. 5A is a diagram illustrating a unconnection window in a case of AVRCP 1.4.
Figure 5B:
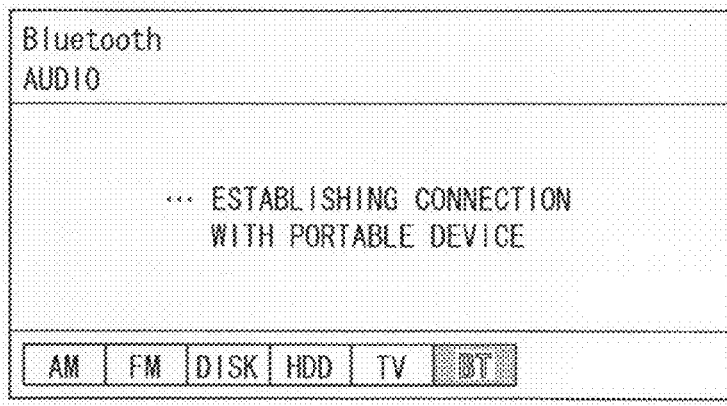
FIG. 5B is a diagram illustrating a connection establishing window in a case of AVRCP 1.4.
Figure 5C:
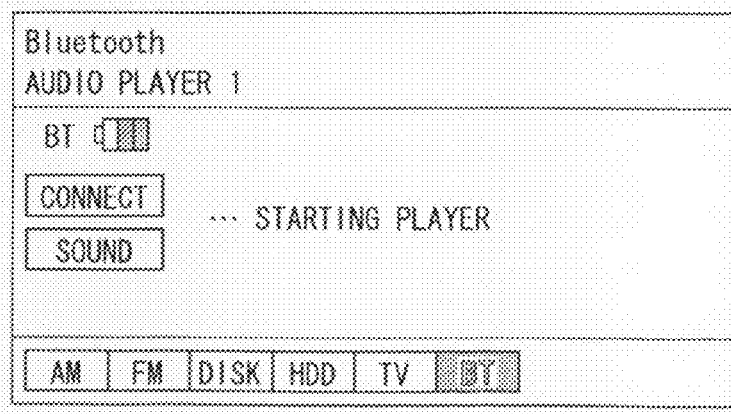
FIG. 5C is a diagram illustrating a player starting window in a case of AVRCP 1.4.

In the case of the AVRCP-1.4-based connection, the controller 4 displays a unconnection window 51 on the display device 7 to indicate that a portable device (e.g., a cellular phone) is unconnected with the in-vehicle apparatus 2, as shown in FIG. 5A. The unconnection window 51 has a "connect" button 51a. When the controller 4 determines that the "connect" button 51a of the unconnection window 51 is pressed, the controller 4 displays a connection establishing window 52 on the display device 7 to indicate that the connection with a portable device is being established, as shown in FIG. 5B. In addition, the controller 4 acquires the application information from the cellular phone 3, selects and starts the media player. Then, the controller 4 displays a player starting window 54 on the display device 7 to indicate that the media player is being started, as shown in FIG. 5C.

Figure 6A:
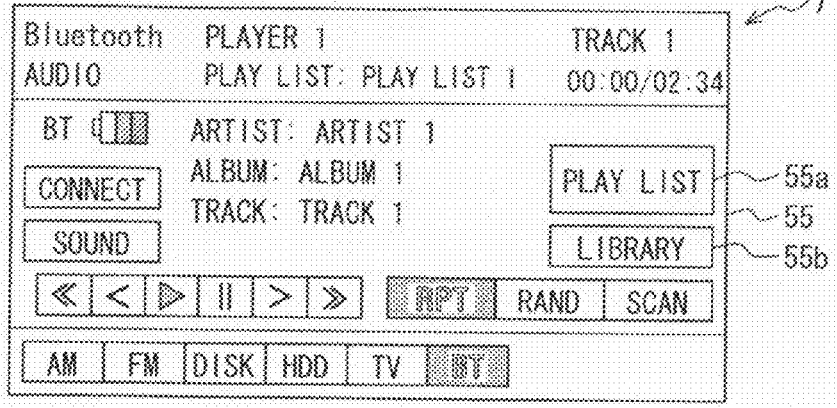
FIG. 6A is a diagram illustrating a main window in a case of AVRCP 1.4.

In response to completion of AVSLC (audio/video service level connection), the controller 4 displays a main window 55 on the display device 7, as shown in FIG. 6A. The main window 55 for the AVRCP 1.4 is different from the main window 53 for the AVRCP 1.3 in that the main window 55 for the AVRCP 1.4 further includes a "play list" button 55a and a "library" button 55b. After display of the main window 55, a user can have a merit of an added-value by pressing the "play list" button 55a and the "library" button 55b.

Figure 6B:
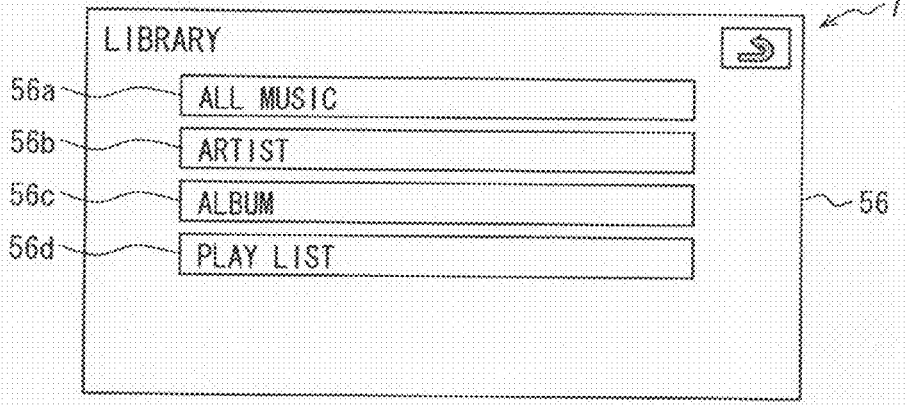
FIGS. 6B, 6C, 7A to 7C are diagrams each illustrating a browse window in a case of AVRCP 1.4.
Figure 6C:
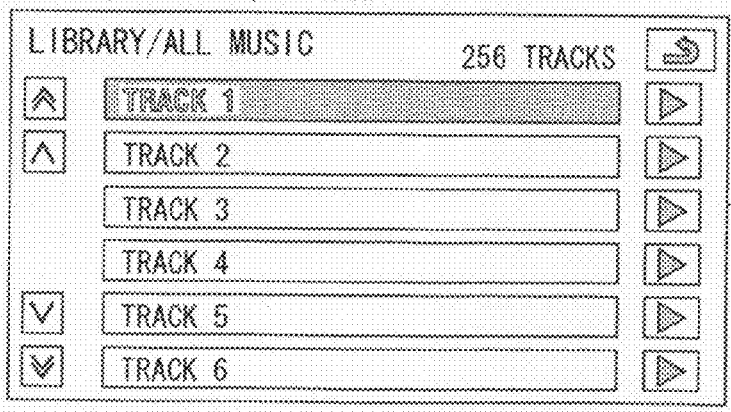
Figure 7A:
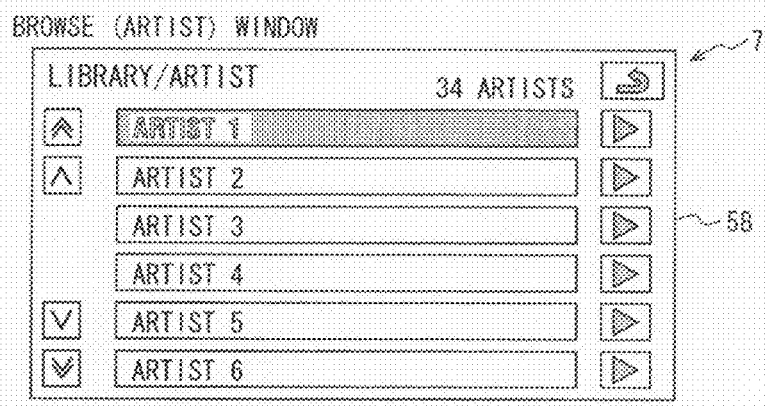
Figure 7B:
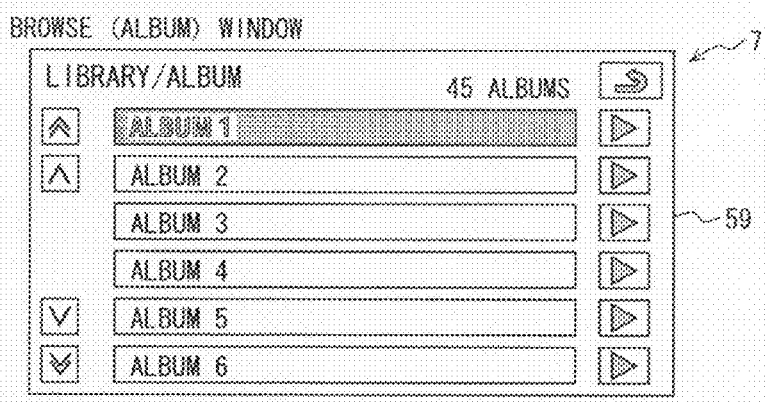
Figure 7C:
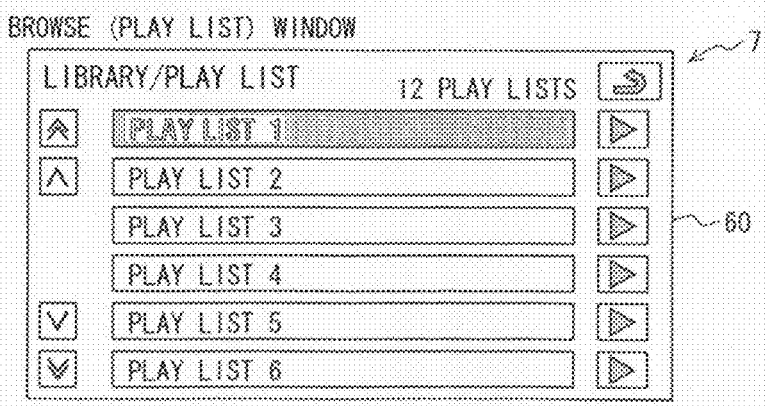

More specifically, when the controller 4 determines that the "library" button 55b of the main window 55 is pressed, the controller 4 displays a browse window 56 for browse on the display device 7, as shown in FIG. 6B. The browse window 56 has an "all music" button 56a, an "artist" button 56b, an "album" button 56c and a "play list" button 56d. When the controller 4 determines that the "all music" button 56a of the browse window 56 is pressed, the controller 4 displays a browse window 57 for all music on the display device 7, as shown in FIG. 6C. When the controller 4 determines that the "artist" button 56b of the browse window 56 is pressed, the controller 4 displays a browse window 58 for artist on the display device 7, as shown in FIG. 7A. When the controller 4 determines that the "album" button 56c of the browse window 56 is pressed, the controller 4 displays a browse window 59 for album on the display device 7, as shown in FIG. 7B. When the controller 4 determines that the "play list" button 56d of the browse window 56 is pressed, the controller 4 displays a browse window 60 for album on the display device 7, as shown in FIG. 7C. Due to the above manners, a user can easily browse music, artists, albums and playlists.

As described above, according to one embodiment, when the cellular phone 3 has the multiple applications for sound output including the media player, the TV application, the radio application and the game application, the in-vehicle apparatus 2 can, establish the connection with the cellular phone 3 by using AVRCP 1.4 and can acquire the application information from the cellular phone 3. Further, the in-vehicle apparatus 2 can automatically select one of the applications and causes the cellular phone 3 to start the selected one of the applications. According to this configuration, it is possible to omit a user operation of manually selecting a most suitable application, and it is possible to optimally process the audio data streamed from the cellular phone 3.

In this relation, the controller 4 has a predetermined selection criterion to select a start-candidate application from the multiple applications, the start-candidate application being the one of the plurality of applications to be started in the external device. The predetermined selection criterion includes a first selection criterion, which is such that if the application registered as a default (default application) in the cellular phone 3 has the audio function and the browsing function, the in-vehicle apparatus 2 selects the default application and causes the cellular phone 3 to start the selected default application. Thus, it is possible to preferentially use the application that is registered as a default in the cellular phone 3 and that has the browsing function and the audio function. It is thus possible to preferentially use the application registered as a default, which is considered to be most frequently used in the cellular phone 3.

In the present embodiment, the BT communication device 5 is connectable with the cellular phone 3 via a local wireless communication link, and the BT communication device 5 can acquire the application information from the external device via the local wireless communication link when the BT communication device 5 is connected with the external device via the local wireless communication link. According to the above configuration, since the application information, which is information on the application installed in the cellular phone 3, can be transmitted and received between the in-vehicle apparatus 2 and the cellular phone 3, it is possible to improve freedom of arrangement of the in-vehicle apparatus 2 and the cellular phone 3.

The predetermined selection criterion includes a first selection criterion, which is such that if the application registered as a default in the cellular phone 3 does not have the audio function or the browsing function, the in-vehicle apparatus 2 selects the application registered as a top level in the cellular phone 3 from among the applications having the audio function and the browsing function, and causes the cellular phone 3 to start the selected application. In the above, the default application is excluded from the applications having the audio function and the browsing function. According to this configuration, it is possible to give priority to the application that is registered as a top level in the cellular phone 3 among the applications, except the default application, having the audio function and the browsing function.

The above embodiments can be modified and extended in various ways, examples of which are described below. In the above embodiment, a sound output control device is applied to an in-vehicle apparatus. Alternatively, a sound output control device may be applied to an in-vehicle handsfree apparatus having a handsfree function, an in-vehicle navigation apparatus having a navigation function, or a handsfree-supporting in-vehicle navigation apparatus having both of a handsfree function and a navigation function. Furthermore, a sound output control device is not limited to such in-vehicle apparatuses. For example, a sound output control device may be applied to an information processing device to be placed or installed inside a room. In the above embodiment, an external device is applied to a cellular phone. Alternatively, an external device may be applied to, a portable information terminal. Furthermore, an external device is not limited to such portable devices. For example, an external device may be applied to an information processing device to be placed or installed inside a room. Furthermore, a sound output control device and an external device are not limited to the in-vehicle apparatus and the cellular phone but may be information processing devices to be placed or installed inside a room. In the above embodiment, a BT communication link is used to connect the in-vehicle apparatus and the cellular phone, and the application information is transmitted and received between the in-vehicle apparatus and the cellular phone via the BT communication link. Alternatively, the application information may be transmitted and received between the in-vehicle apparatus and the cellular phone via wired communications. A selection criterion for selection of one of multiple application is not limited to a flowchart illustrated in FIG. 2. For example, another selection criterion may be used, in which an application to which a high priority is assigned by an in-vehicle apparatus may be preferentially selected.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be installed in a computer via a communications network.

What is claimed is:

1. A sound output controller in a subject device, the sound output controller comprising:
   a control section that is equipped in the subject device, and configured to process audio data streamed from an external device through causing the external device to automatically start one of a plurality of applications for sound output, wherein the plurality of applications are applications installed in the external device, wherein the external device is external to the subject device; and
   an application information acquisition section that is equipped in the subject device, and configured to automatically acquire application information from the external device, wherein the application information is information on the plurality of applications installed in the external device, wherein:
   the control section of the subject device is provided with a predetermined selection criterion to automatically select a start-candidate application from the plurality of applications of the external device, the start-candidate application being the one of the plurality of applications that is to be automatically started in the external device;
   according to the predetermined selection criterion and the application information acquired by the application information acquisition section from the external device, the control section of the subject device automatically selects the start-candidate application and causes the external device to automatically start the selected start candidate application;
   when a default application, which is registered as a default in the external device among the plurality of applications, has an audio function and a browsing function, the control section automatically selects the default application as the start-candidate application and causes the external device to automatically start the selected default application; and
   in response to establishment of a connection between the subject device and the external device, the sound output controller of the subject device automatically, without requiring a user manual operation,
   (i) acquires the application information from the external device,
   (ii) selects the start-candidate application from the plurality of applications of the external device according to the acquired application information and the predetermined selection criterion, and
   (iii) causes the external device to start the selected start candidate application.

2. The sound output controller of claim 1, wherein:
   when the default application registered as the default in the external device does not have at least one of the audio function and the browsing function, the control section selects a top level application as the start-candidate application and causes the external device to start the top level application;
   the top level application is registered in the external device as a top level among a predetermined group of applications;
   the predetermined group of applications is a part of the plurality of applications of the external device; and
   each application in the predetermined group of applications has the audio function and the browsing function.

3. The sound output controller of claim 1, further comprising:
   a communication link connection section that is connectable with the external device via a local wireless communication link, wherein:
   when the communication link connection section is connected with the external device via the local wireless communication link, the application information acquisition section acquires the application information, which is the information on the plurality of applications of the external device, from the external device via the local wireless communication link.

4. The sound output controller of claim 1, wherein:
   the browsing function is a function of transferring information on tracks, artist, album and play list.

5. The sound output controller of claim 1, wherein:
   the subject device is an in-vehicle navigation apparatus in a vehicle; and
   the external device is a cellular phone carried in the vehicle.

6. The sound output controller of claim 1, wherein the control section always automatically selects the default application as the start-candidate when the default application has the audio and the browsing function.

7. A sound output controller in a subject device, the sound output controller comprising:
   a control section that is equipped in the subject device, and configured to process audio data streamed from an external device through causing the external device to automatically start one of a plurality of applications for sound output, wherein the plurality of applications are applications installed in the external device, wherein the external device is external to the subject device; and
   an application information acquisition section that is equipped in the subject device, and configured to automatically acquire application information from the external device, wherein the application information is information on the plurality of applications installed in the external device, wherein:
   the control section of the subject device is provided with a predetermined selection criterion to automatically select a start-candidate application from the plurality of applications of the external device, the start-candidate application being the one of the plurality of applications that is to be automatically started in the external device;

according to the predetermined selection criterion and the application information acquired by the application information acquisition section from the external device, the control section of the subject device automatically selects the start-candidate application from the plurality of applications of the external device and causes the external device to automatically start the selected start candidate application; and in response to establishment of a connection between the subject device and the external device, the sound output controller of the subject device automatically, without requiring a user manual operation,
  (i) acquires the application information from the external device,
  (ii) selects the start-candidate application from the plurality of applications of the external device according to the acquired application information and the predetermined selection criterion, and
  (iii) causes the external device to start the selected start candidate application.

8. The sound output controller of claim 7, wherein:
according to the predetermined selection criterion, the control section of the subject device selects one application having a browsing function and a music playback function as the start-candidate application from the plurality of applications, and thereafter, the control section causes the external device to start the start-candidate application having the browsing function and the music playback function.

9. The sound output controller of claim 8, wherein:
when a default application, which is registered as a default in the external device among the plurality of applications, has the browsing function and the music playback function, the control section of the subject device selects the default application as the start-candidate application and causes the external device to start the selected default application; and when the default application, which is registered as the default in the external device, does not have at least one of the browsing function and the music playback function, the control section of the external device selects one application having the browsing function and the music playback function as the start-candidate application from the plurality of applications except the default application and causes the external device to start the selected start-candidate application.

10. The sound output controller of claim 7, wherein:
the browsing function is a function of transferring information on tracks, artist, album and play list.

11. The sound output controller of claim 7, wherein:
the subject device is an in-vehicle navigation apparatus in a vehicle; and the external device is a cellular phone carried in the vehicle.

12. The sound output controller of claim 7, wherein the control section always automatically selects the default application as the start-candidate when the default application has the audio and the browsing function.

* * * * *